UNITED STATES PATENT OFFICE.

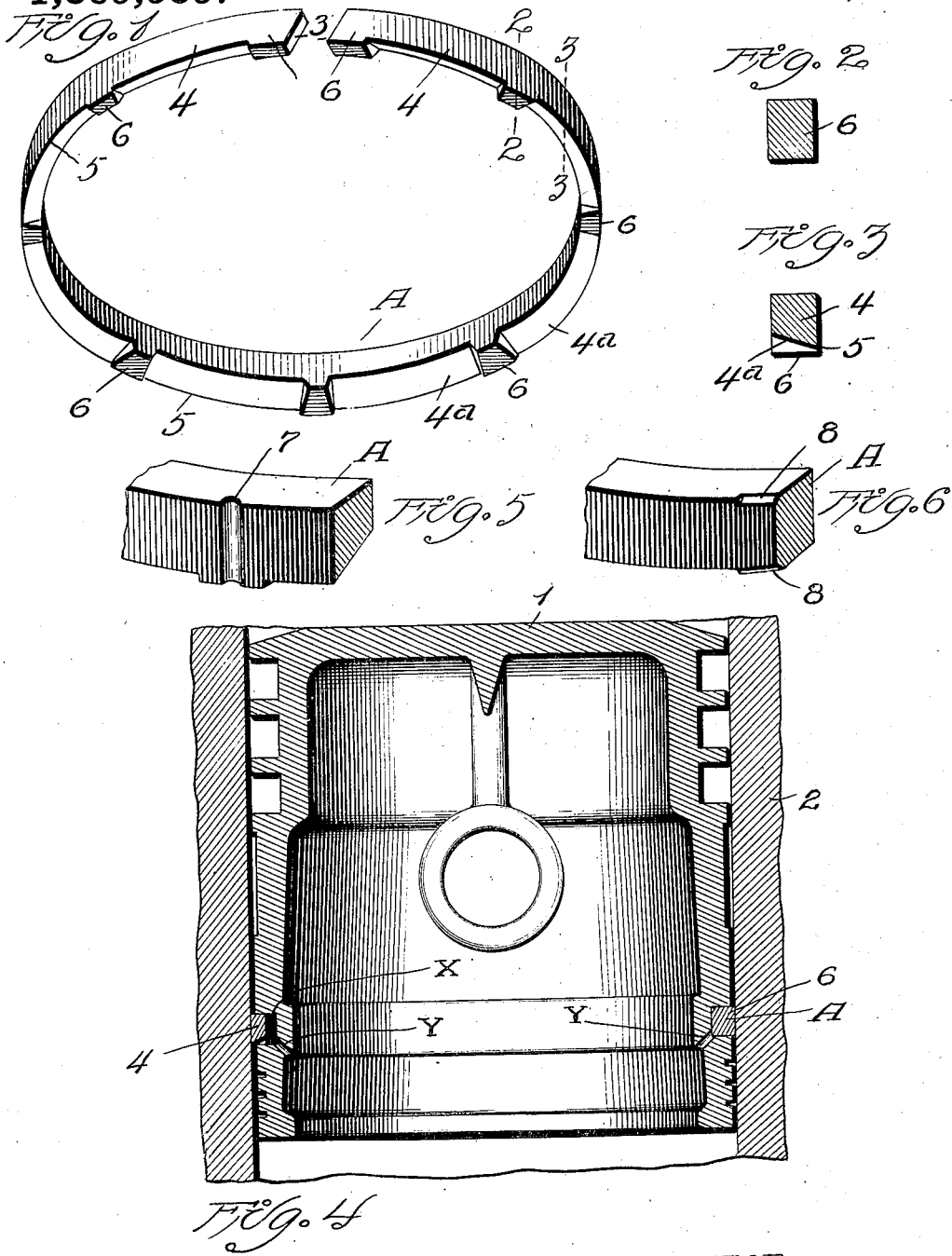

WILLIAM L. SULLIVAN, OF FERGUSON, MISSOURI.

PISTON-RING.

1,369,989.  Specification of Letters Patent.  Patented Mar. 1, 1921.

Application filed September 20, 1918. Serial No. 254,942.

*To all whom it may concern:*

Be it known that I, WILLIAM L. SULLIVAN, a citizen of the United States, residing at Ferguson, Missouri, have invented a certain new and useful Improvement in Piston-Rings, of which the following is a full, clear, and exact description, such as will enable others skilled in the art to which it appertains to make and use the same.

This invention relates to piston rings, and has for its main object to provide a piston ring that will prevent an abnormal supply of oil from working upwardly past the piston, but will permit sufficient oil to travel upwardly over the side wall of the cylinder in which the piston travels to insure proper lubrication of the cylinder.

Another object is to provide an efficient means for removing and recovering the excess oil on the side wall of the cylinder of an internal combustion engine, pump or other machine equipped with a splash lubricating system, without liability of diminishing the oil supply to such an extent that the cylinder will not be lubricated properly.

To this end I have devised a piston ring which is provided with a plurality of scraping portions arranged intermediate non-scraping portions, the scraping portions of the ring being so designed that they will remove the excess oil from the side wall of the cylinder in which the piston reciprocates, and the non-scraping portions being so designed that sufficient oil will travel upwardly over the surfaces of the cylinder on which said non-scraping portions slide to insure proper lubrication of the cylinder. Said ring can be used either as a compression ring or as an oil ring. When it is used on an oil ring it is preferably arranged below the wrist pin bearing and the groove in the piston which receives said ring is preferably provided with oil holes arranged in such a manner that the excess oil which is scraped off the side wall of the cylinder and directed into said groove by the scraping portions of the ring will drain back into the crank case of the engine or machine on which the ring is used.

Figure 1 of the drawings is a perspective view of my improved piston ring.

Fig. 2 is a sectional view of said ring, taken on the line 2—2 of Fig. 1.

Fig. 3 is a sectional view of said ring, taken on the line 3—3 of Fig. 1.

Fig. 4 is a vertical sectional view, illustrating my improved piston ring used as an oil ring on a piston; and Figs. 5 and 6 are views illustrating slight modifications of my invention.

Referring to the drawings which illustrate my invention, the reference character 1 in Fig. 4 designates a piston that is reciprocatingly mounted in a cylinder 2, and A designates my improved piston ring which is arranged in an annular groove $x$ in the piston, preferably located in the lower portion of the piston at a point below the wrist pin bearing. The piston ring A is similar in general form to the ordinary one-piece piston rings now in general use and is split at 3, as shown in Fig. 1, so as to insure said ring remaining in snug engagement with the side wall of the cylinder when the piston is in operation, the joint or split 3 in the ring being formed either by a diagonal cut in the ring or in any other preferred manner.

In the preferred form of my invention, as illustrated in Fig. 1, the piston ring A is provided with a plurality of scraping portions 4 formed by segmental sections of the ring which are of such cross-sectional shape that the lower outside edges 5 of same will constitute knife edges or scraping edges that remove the excess oil from the side wall of the cylinder 2 and direct said excess oil inwardly into the groove $x$ in which the ring A is arranged. Said scraping portions 4 are arranged intermediate non-scraping portions 6 which are of such cross-sectional shape that sufficient oil will travel upwardly over the surfaces of the side wall of the cylinder on which said non-scraping portions slide to insure proper lubrication of the cylinder. The non-scraping portions 6 of the ring are rectangular-shaped in cross section, as shown in Fig. 3, and are of such height that they substantially fill the groove $x$ in the piston in which the ring C is arranged, thereby holding the ring in operative position, and providing a plurality of surfaces at the lower outside edge of the ring which are sufficiently blunt to permit some oil to travel upwardly past the ring A. The top faces and the outside faces of the scraping portions 4 of the ring extend flush with and constitute continuations of the corresponding faces of the non-scraping portions 6, but the lower faces 4ª of said scraping portions 4 are inclined upwardly away from the bottom of the groove $x$ in which the ring A is arranged, as shown in Fig. 4, so as to form pockets for receiving the excess oil that the scraping edges 5 of the ring remove from the side wall of the cylinder. In practice I prefer to have the scraping edges 5 terminate a slight distance above the lower outside edges of the non-scraping portions 6 of the ring, as shown in Figs. 1 and 3, so as to permit the excess oil that is removed from the cylinder to flow readily into the groove $x$ in which the ring is arranged. The ring A can either be arranged in the manner shown in Fig. 4 of the drawings so as to cause the excess oil to be scraped off the side wall of the cylinder on the downward stroke of the piston, or said ring can be reversed so as to cause the excess oil to be removed from the side wall of the cylinder on the upward stroke of the piston. When the ring is used as an oil ring, as shown in Fig. 4, it is preferable to provide the piston with oil holes $y$ arranged so that the oil which collects in the groove $x$ will drain back into the crank case of the engine or machine. The particular angle or bevel of the lower faces of the scraping portions $b$ of the ring is immaterial, so long as the lower faces of the scraping portions of the ring are of such shape that they tend to direct the excess oil inwardly into the groove $x$ in the piston. The particular number of scraping portions 4 that the ring is provided with is also immaterial, and in practice the width or area of said portions will vary according to the particular engine or machine on which the ring is used, the essential thing being to provide a ring that has non-scraping portions of sufficient area to permit enough oil to travel upwardly past the ring to insure proper lubrication of the side wall of the cylinder in which the piston reciprocates. While my improved ring is particularly adapted for use as an oil ring, it is not limited to this use, but is capable of use as a compression ring. When used as a compression ring, however, the groove in the piston that receives the ring cannot be provided with oil holes.

As a general rule, enough oil will travel upwardly past the non-scraping portions 6 of the ring to insure proper lubrication of the cylinder, but in some instances, for example, when the ring is used in an engine or machine that is lubricated with heavy oil, it is desirable either to form vertical grooves 7 in the outer sides of the non-scraping portions of the ring, as shown in Fig. 5, or bevel the top and bottom edges of the outside face of said non-scraping portions at 8, as shown in Fig. 6, so as to insure the oil traveling upwardly past the non-scraping portions of the ring.

A piston ring of the construction above described, when used in an internal combustion engine, pump or other machine whose cylinder receives too much oil, will cut down the abnormal supply of oil without liability of diminishing the oil supply to such an extent that the cylinder will not be properly lubricated, owing to the fact that the scraping portions 4 of the ring scrape off the excess oil from the side wall of the cylinder and the non-scraping portions 6 of the ring permit sufficient oil to travel upwardly past the ring to insure a film of oil remaining on the side wall of the cylinder. It can be used either as a compression ring or as an oil ring, and when it is combined with a piston whose ring groove is provided with oil holes as shown in Fig. 4, it insures the return to the crank case of the excess oil that the portions 4 of the ring scrape off the side wall of the cylinder. My imroved ring can be manufactured at a low cost, and another desirable feature of said ring is that it will remain in proper position in the piston, owing to the fact that the non-scraping portions 6 of the ring conform approximately to the cross-sectional shape of the groove in the piston that receives the ring, and thus prevent the ring from working up and down in the groove, as would occur if the ring were provided throughout its entire circumference with a beveled scraping edge.

Having thus described my invention, what I claim and desire to secure by Letters Patent, is:

1. A piston ring provided at its outer side with segmental scraping portions equipped with sharp edges that remove the excess oil from the side wall of the cylinder, and non-scraping blunted portions arranged intermediate said scraping portions which permit the excess oil to continuously remain on the portions of the side wall of the cylinder on which said non-scraping portions act, thereby causing sufficient oil to remain on the side wall of the cylinder to insure proper lubrication of the cylinder.

2. A piston ring provided at its outer side with sharp edged scraping portions that remove the excess oil from the side wall of the cylinder, and blunt edged non-scraping portions that travel over the side wall of the cylinder and permit the excess oil to remain thereon.

3. A piston ring provided with spaced non-scraping blunted portions whose top and bottom edges bear against the top and bottom walls of the ring groove in the piston, the sections of the ring between said portions being beveled on one edge only so as to constitute segmental-shaped scraping portions which remove the excess oil from the portions of the side wall of the cylinder traversed thereby and direct said oil into the ring groove, while the oil is permitted to remain on those portions of the cylinder wall traversed by said non-scraping portions.

WILLIAM L. SULLIVAN.